(12) United States Patent
Trantow et al.

(10) Patent No.: US 6,540,231 B1
(45) Date of Patent: Apr. 1, 2003

(54) SURFACE FOLLOWING BRUSH SEAL

(75) Inventors: Richard L. Trantow, Cincinnati, OH (US); Jimmy A. Murphy, West Chester, OH (US); Ronald R. Eskridge, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/515,258

(22) Filed: Feb. 29, 2000

(51) Int. Cl.⁷ ................................................ F16J 15/44
(52) U.S. Cl. .................... 277/355; 277/422; 415/174.2
(58) Field of Search .................................. 277/355, 422; 415/170.1, 173.7, 171.1, 173.3, 174.2; 60/39.75

(56) References Cited

U.S. PATENT DOCUMENTS

| | | | | |
|---|---|---|---|---|
| 3,997,175 A | * | 12/1976 | Geary | 277/422 |
| 4,998,739 A | * | 3/1991 | Weiler | 277/422 |
| 5,026,252 A | * | 6/1991 | Hoffelner | 415/174.2 |
| 5,174,582 A | * | 12/1992 | Ferguson | 277/355 |
| 5,318,309 A | | 6/1994 | Tseng et al. | |
| 5,400,586 A | * | 3/1995 | Bagepalli et al. | 60/39.32 |
| 5,400,952 A | * | 3/1995 | Hetico et al. | 228/185 |
| 5,474,305 A | * | 12/1995 | Flower | 277/355 |
| 5,484,014 A | * | 1/1996 | Maier | 165/159 |
| 5,496,045 A | * | 3/1996 | Millener et al. | 277/355 |
| 5,568,931 A | | 10/1996 | Tseng et al. | |
| 5,639,211 A | * | 6/1997 | Bintz | 415/173.7 |
| 5,997,004 A | * | 12/1999 | Braun et al. | 277/352 |
| 6,145,844 A | * | 11/2000 | Waggott | 277/412 |
| 6,161,836 A | * | 12/2000 | Zhou | 277/355 |
| 6,168,162 B1 | * | 1/2001 | Reluzco et al. | 277/355 |
| 6,226,975 B1 | * | 5/2001 | Ingistov | 60/39.02 |

* cited by examiner

*Primary Examiner*—Anthony Knight
*Assistant Examiner*—Alison K. Pickard
(74) *Attorney, Agent, or Firm*—Nathan D. Herkamp; Pierce Atwood

(57) ABSTRACT

Brush seal lifetime and sealing efficiency are increased by providing a brush seal with a holder and a carrier moveably suspended from the holder by a plurality of flexible support wires. A plurality of bristles is secured to the carrier. Preferably, the holder is attached to a stationary member, and the bristles sealingly engage a rotating member.

27 Claims, 5 Drawing Sheets

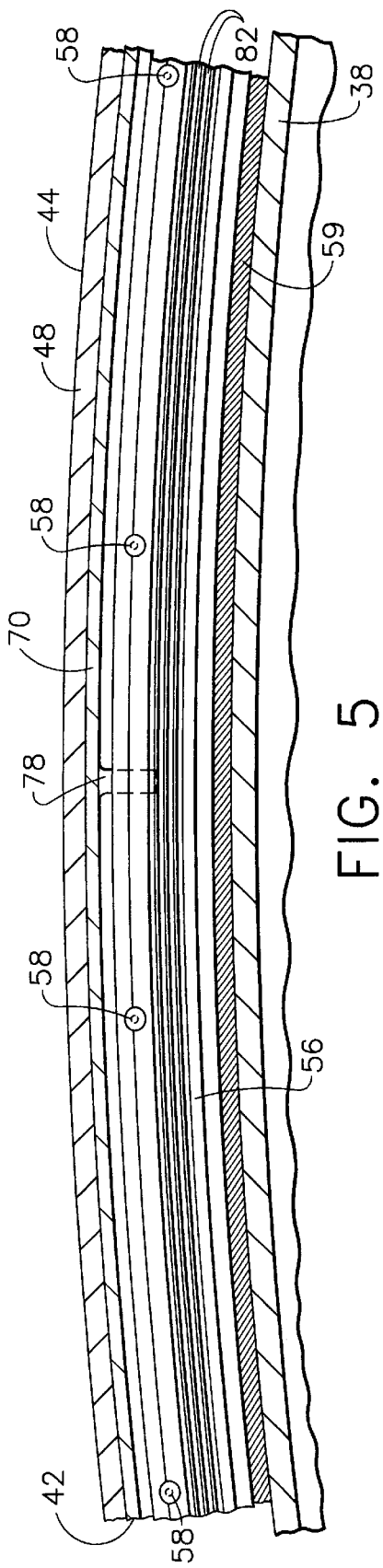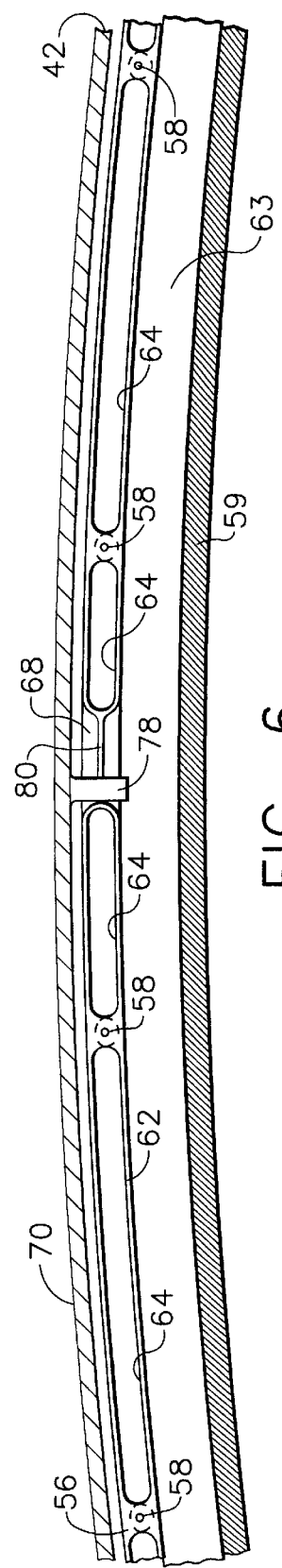

SURFACE FOLLOWING BRUSH SEAL

BACKGROUND OF THE INVENTION

This invention relates generally to brush seals and more particularly to brush seals for use in gas turbine engines.

A gas turbine engine operates according to well known principles wherein an incoming stream of atmospheric air flows through the engine along an axially extending flow path. At least a portion of the incoming air is compressed in a compressor section of the engine and then mixed with fuel and burned in a combustor section to produce a high energy, high temperature exhaust gas stream. The hot gas stream exits the combustor and subsequently passes through a turbine section that extracts energy from the exhaust gas stream to power the compressor and provide useful work such as powering an aircraft in flight.

Uncontrolled leakage of gases—such as atmospheric air, exhaust gases, or other—within the engine contributes to a reduced engine efficiency. Seals are used to control this energy loss by interposing them in a leakage path to reduce the volume or mass of gas passing from one part of the engine to another. Labyrinth seals have been commonly used in gas turbine engines for sealing between relatively movable components. However, the use of brush seals as a substitute for labyrinth seals is also known.

A conventional brush seal typically includes a bristle pack having a plurality of bristles disposed between a pair of annular plates. The bristles usually are disposed at about a forty five degree angle to a radius drawn from the engine centerline. A brush seal is typically attached along its outer radial edge to a stationary engine part with the radially inner, free ends of the bristles disposed in a sealing engagement with a sealing surface on a rotating engine part. Brush seals are not intended to function so as to completely seal one engine section from another, but rather rely upon the tortuous flow path created between the bristles to reduce gas flow therethrough and to control the pressure drop between the engine sections.

The bristles in the bristle pact are somewhat flexible and are thus able to bend during an engine transient and still retain their sealing ability after the transient has passed. Examples of such transients include differential thermal growth between the stationary and rotating engine parts and relative lateral motion between the stationary and rotating engine parts due to engine vibrations and/or eccentric shaft rotation. The sealing efficiency of a brush seal over time is affected by the wear on the bristle ends contacting the sealing surface on the rotating engine part, as well as the overall contact of the bristle ends with the sealing surface. However, in some instances, the relative lateral motion between the engine parts can be of a magnitude large enough to cause significant bristle flexure, which leads to premature and excessive wear on the bristles. Premature bristle wear will require replacement of the seal or bristle pack earlier than otherwise would be necessary, thereby increasing engine operating costs.

It would be desirable to increase the lifetime and sealing efficiency of brush seals by reducing premature and excessive bristle wear due to significant engine alignment offsets.

BRIEF SUMMARY OF THE INVENTION

The above-mentioned need is met by the present invention, which provides a brush seal having a holder and a carrier moveably suspended from the holder by a plurality of flexible support wires. A plurality of bristles is secured to the carrier. Preferably, the holder is attached to a stationary member, and the bristles sealingly engage a rotating member.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

FIG. 5 is an axial sectional view of the brush seal taken along line 5—5 of FIG. 4.

FIG. 6 is an axial sectional view of the brush seal taken along line 6—6 of FIG. 4.

DETAILED DESCRIPTION OF THE INVENTION

Figure 1:
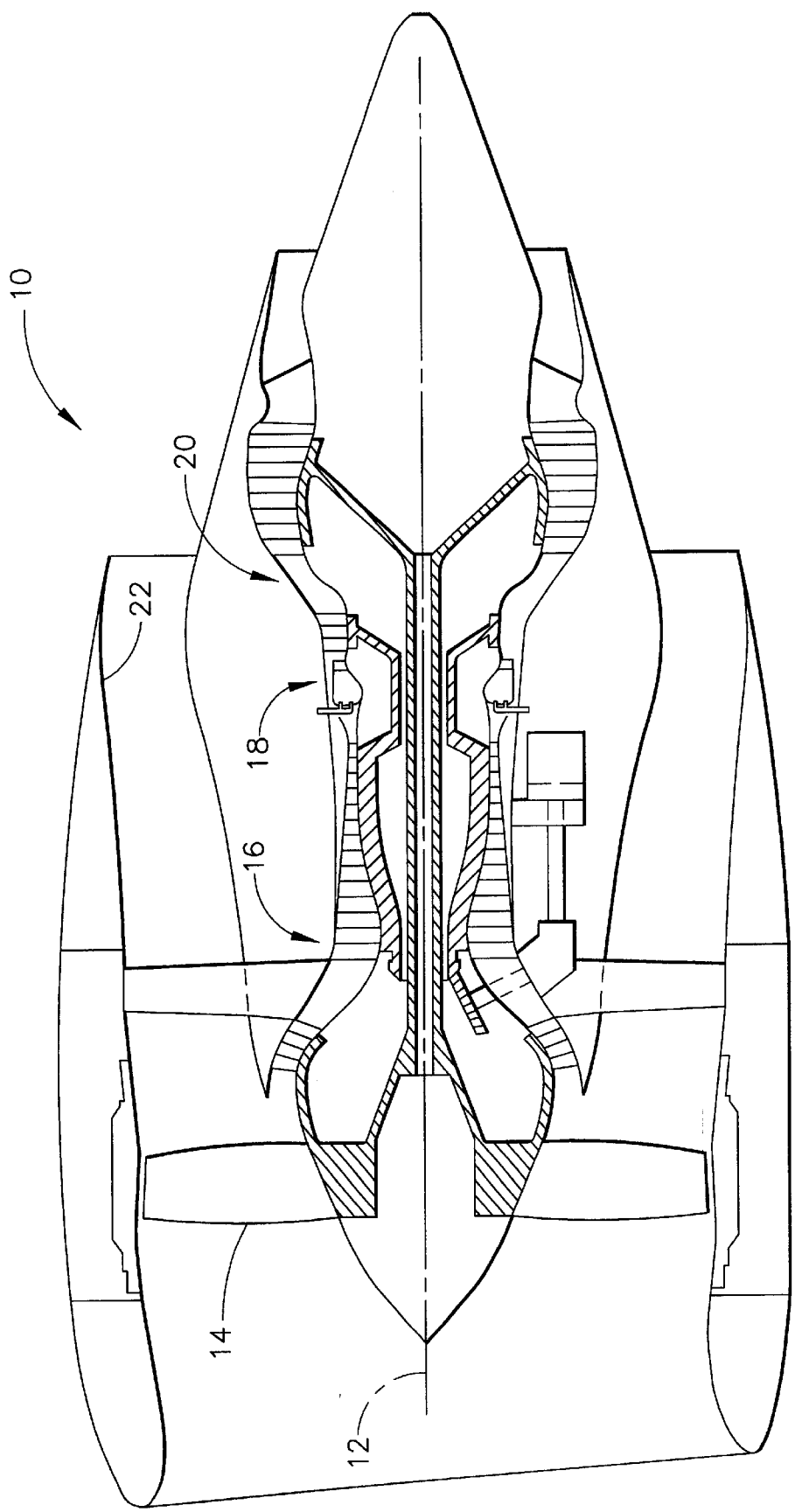
FIG. 1 is longitudinal sectional view of an exemplary turbofan gas turbine engine wherein an application of the present invention is illustrated.

Referring to the drawings wherein identical reference numerals denote the same elements throughout the various views, the present invention is described relative to one possible application in an aircraft gas turbine engine 10, which is shown in FIG. 1. Specifically, the engine 10 is a high bypass ratio turbofan engine that includes, in serial axial flow communication about a longitudinal centerline axis 12, a fan 14, a compressor section 16, a combustor section 18, and a turbine section 20. An incoming air stream enters the engine 10 with a portion thereof flowing through a bypass duct 22 to produce bypass thrust. The remaining portion of the air stream enters the compressor section 16. This air is compressed in the compressor section 16 and passed to the combustor section 18 where it is mixed with fuel, and the air/fuel mixture is ignited. The ignited air/fuel mixture produces a high-temperature gas stream that passes through the turbine section 20. The turbine section 20 extracts energy from the hot gas stream and uses the energy to power the compressor section 16 and the fan 14 that generates the aforementioned bypass thrust.

Figure 2:
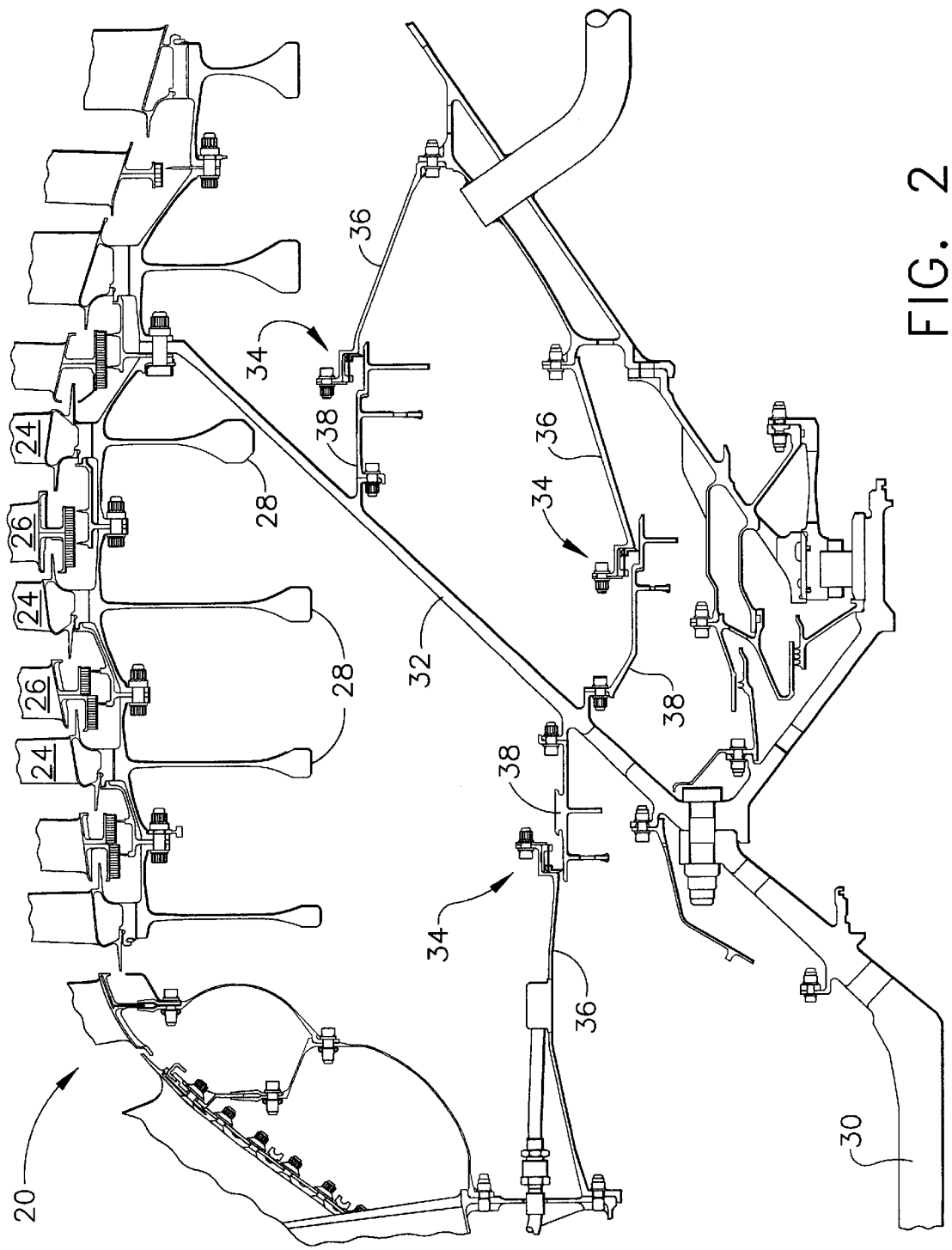
FIG. 2 is a detailed sectional view of the turbine section from the gas turbine engine of FIG. 1.

Turning to FIG. 2, a portion of the turbine section 20 is shown in more detail. As is well known, the turbine section 20 includes a plurality of circumferential rows of substantially radially directed rotor blades 24 interdigitated with one or more circumferential rows of substantially radially extending stator vanes 26. The rotor blades 24 of each row are mounted to a rotor disk 28. The rotor disks 28 are in turn rigidly connected to a rotating turbine shaft 30 via a turbine shaft cone 32 for rotation about the engine's centerline axis 12 (not shown in FIG. 2). The turbine section 20 further includes a number of brush seals 34 that are interposed between stationary engine structural members or seal supports 36 and rotating members 38 that are rigidly attached to the turbine shaft cone 32 for rotation therewith. The rotating members 38 are generally cylindrical in form and are partially located within the corresponding one of the seal supports 36, which are also generally cylindrical in form.

As will be described in more detail below, each brush seal 34 includes a plurality of bristles that extends from a fixed connection with the respective seal support 36 to a sealing engagement with the corresponding rotating member 38. The brush seals 34 are positioned in the turbine section 20 so as to prevent undesired leakage of gases, such as cooling air at different pressures, from one cavity to another within the engine 10. It should be noted that while the brush seal of the present invention is described herein relative to its use in the turbine section of a turbofan engine, it is not limited to this application. Indeed, the present invention can be used in many other applications within a gas turbine engine or elsewhere.

Figure 3:
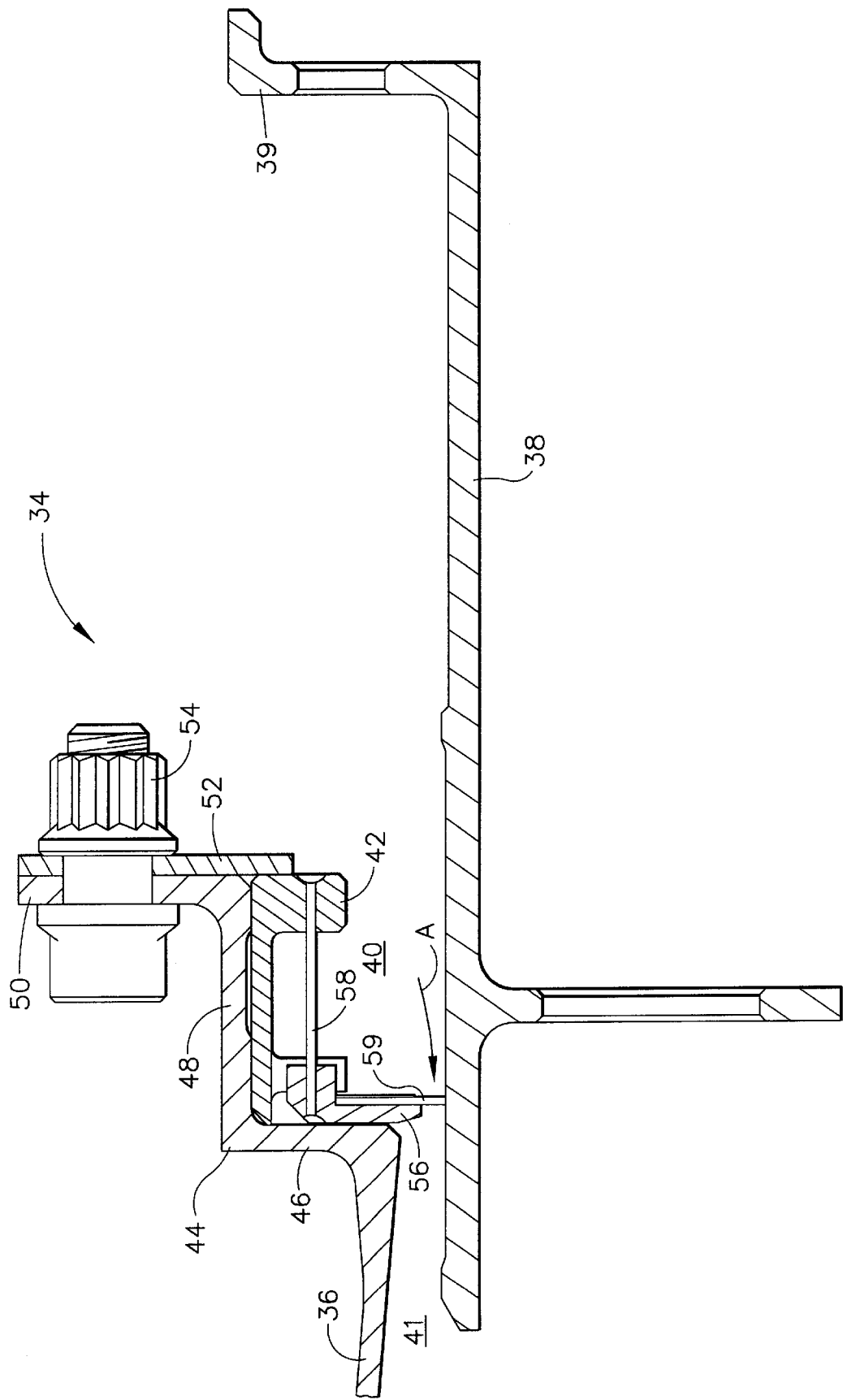
FIG. 3 is a sectional view of an exemplary embodiment of a brush seal.

Referring now to FIG. 3, an exemplary embodiment of the brush seal 34 of the present invention is shown in more detail. The brush seal 34 is disposed in an annular gap between the seal support 36 and the rotating member 38. As mentioned above, both the seal support 36 and the rotating member 38 are generally cylindrical in form, and the stationary seal support 36 surrounds the forward end of the rotating member 38 so as to define the aforementioned annular gap. The rotating member 38 is joined to the turbine shaft cone 32 (not shown in FIG. 3) via a flange 39 formed on the aft end thereof. The annular gap forms a leakage path between a first cavity 40 and a second cavity 41. For the purposes of illustration, the first cavity 40 is at a higher pressure than the second cavity 41 so that any flow through the gap would be in the direction indicated by arrow A in FIG. 3.

The brush seal 34 includes an annular holder 42 that is disposed coaxially with respect to the centerline axis 12 in a seal pocket 44 formed on the aft end of the seal support 36. Although the seal pocket 44 is shown as being disposed on the aft end of the seal support 36, it should be noted that the present invention is not limited to this configuration. A seal pocket could also be located on the forward end of the seal support, depending on the configuration of the particular seal support-rotating member combination to be sealed. The seal pocket 44 includes a radially oriented wall 46 and an axially oriented wall 48. A mounting flange 50 extends radially outward from the distal end of the axial wall 48. The holder 42 is attached to the seal support 36 by a retainer plate 52. The retainer plate 52 is an annular member fixedly secured to the mounting flange 50 by conventional fasteners 54 so that it firmly engages the holder 42 for retention in the seal pocket 44 via a pressure fit. An annular carrier 56 is disposed radially within the holder 42 and moveably suspended from the holder 42 by a plurality of axially-oriented, flexible support wires 58 (only one shown in FIG. 3). Because the support wires 58 are flexible, the carrier 56 is able to move radially with respect to the engine's centerline axis 12 (not shown in FIG. 3).

The brush seal 34 further includes a bristle pack comprising a plurality of bristles 59 disposed around the circumference of the carrier 56. The radially outermost ends of the bristles 59 are secured to the carrier 56, and the radially inner, free ends engage the outer surface of the rotating member 38, thereby sealing the leakage path between the first and second cavities 40 and 41. The bristles 59 are somewhat flexible and are thus able to withstand relative movement in the radial and axial directions that may occur during an engine transient and still retain their sealing ability after the transient has passed. Moreover, because the carrier 56 is moveably suspended from the holder 42, the free ends of the bristles 59 are able to follow the outer surface of the rotating member 38 during engine transients. This reduces bristle flexure, which in turn reduces bristle wear.

Figure 4:
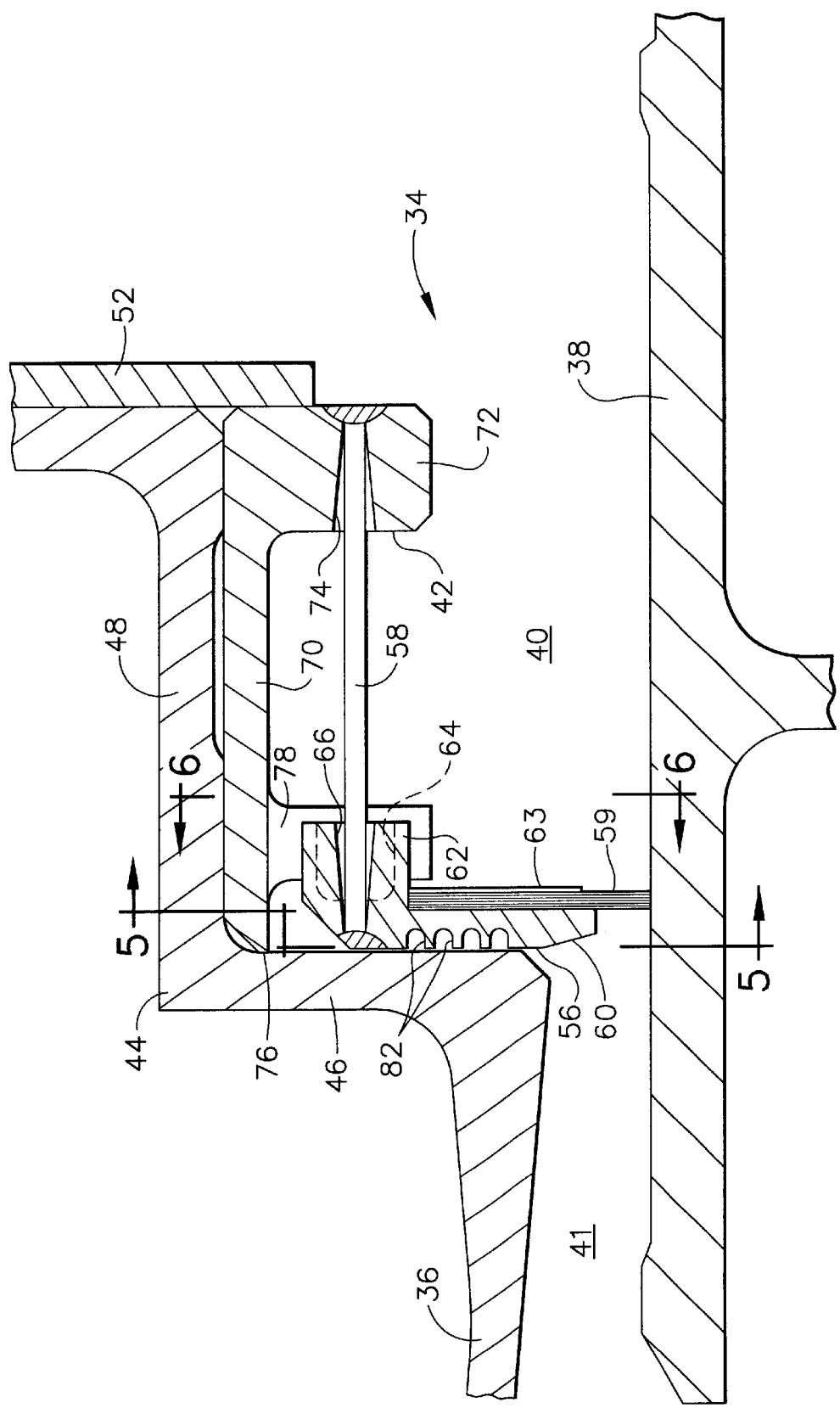
FIG. 4 is an enlarged view of the brush seal of FIG. 3.

Referring now to FIGS. 4–6, it is seen that the carrier 56 comprises an annular body portion 60 having an axially aft extending flange 62 formed on the radially outer end thereof. The bristles 59 are sandwiched between the annular body portion 60 and an annular front plate 63 disposed on the high pressure side of the brush seal 34. The flange 62 has a number of pockets 64 formed in the aft face thereof. As best seen in FIGS. 4 and 6, the pockets 64 are distributed about the circumference of the flange 62 with narrow spaces therebetween. The pockets 64 reduce the mass of the carrier 56 so that it will move quickly in response to lateral motion of the rotating member 38 relative to the seal support 36. The flange 62 also has a number of holes 66 formed between adjacent pockets 64 for receiving an end of a corresponding one of the support wires 58. Preferably, one of the holes 66 is formed in each space between adjacent pockets 64 except one. The other space between adjacent pockets 64 is provided with a slot 68, as shown in FIG. 6, which extends through the radial thickness of the flange 62.

The holder 42 comprises a cylindrical body portion 70 having a radially inward extending flange 72 formed on the aft end thereof. The flange 72 has a number of holes 74 formed therein for receiving the other end of the corresponding support wires 58. The forward edge 76 of the cylindrical body portion 70 abuts the radial wall 46 to axially position the holder 42 in the seal pocket 44. The holder 42 is preferably somewhat longer axially than the axial wall 48 to assure proper loading thereof when engaged by the retainer plate 52. Furthermore, the inside diameter of the cylindrical body portion 70 is greater than the outside diameter of the carrier 56 so as to provide a radial clearance between the carrier 56 and the cylindrical body portion 70.

An anti-rotation tang 78 extends radially inward from the cylindrical body portion 70, near to, but spaced from, the forward edge 76. The anti-rotation tang 78 is received within the slot 68 so as to engage the carrier 56 and prevent rotation of the carrier 56 with respect to the holder 42. The anti-rotation tang 78 is sufficiently thick (on the order of 0.25 inches) to allow for fatigue life.

As seen in FIG. 6, a flexible link 80 is disposed in the slot 68 between the carrier 56 and the anti-rotation tang 78. Preferably, the flexible link 80 is in the form of a metal band attached at one end to the carrier 56 and extends circumferentially to engage the anti-rotation tang 78. The flexible link 80 thus reduces friction between the carrier 56 and the anti-rotation tang 78 as the carrier 56 slides radially due to lateral motion of the rotating member 38 relative to the seal support 36. Preferably, the flexible link 80 is disposed on the pressure side of the anti-rotation tang 78, i.e., the side of the anti-rotation tang 78 against which the carrier 56 reacts against due to rotation of the rotating member 38. As an alternative, the flexible link 80 could be omitted, and the width of the slot 68 would be just slightly larger than the width of the anti-rotation tang 78.

As mentioned above, the carrier 56 is moveably suspended from the holder 42 by the flexible support wires 58. Each support wire 58 extends axially from one of the holes 66 formed in the carrier flange 62 to a corresponding one of the holes 74 formed in the holder flange 72. The opposite ends of each support wire 58 are welded or otherwise fixed to the carrier flange 62 and the holder flange 72, respectively. As seen in FIG. 4, the holes 66 and 74 are tapered such that the load supported by the support wires 58 is distributed over the entire thicknesses or lengths of the carrier flange 62 and the holder flange 72, respectively. Specifically, the aft ends of the holes 66 have a larger opening than the forward ends thereof, and the forward ends of the holes 74 have a larger opening than the aft ends thereof. The support wires 58 are equally spaced circumferentially, and the number of support wires 58 utilized should be sufficient to support the carrier 56. Preferably, enough support wires 58 are used to assure continued viability of the brush seal 34 should some of the support wires 58 fail. Typically, at least 10 support wires 58 will be used.

The length of the support wires 58 is such so as to position the carrier 56 very close to, but not touching, the radial wall 46 of the seal pocket 44. This provides a narrow axial gap between the carrier 56 and the radial wall 46 so that these two elements do not rub together as the carrier 56 moves radially due to lateral motion of the rotating member 38 relative to the seal support 36. The support wires 58 also position the carrier 56 radially so as to leave a sufficient clearance between the radially outer edge of the carrier 56 and the cylindrical body portion 70 of the holder 42 to accommodate radial motion of the carrier 56. Axially aft motion of the carrier 56 is constrained by the axial rigidity of the support wires 58 and the anti-rotation tang 78.

Although it is a very narrow gap, the axial gap between the carrier 56 and the radial wall 46 creates a leakage path between the first and second cavities 40 and 41. A plurality of concentric grooves 82 is formed in the forward surface of the annular body portion 60 of the carrier 56, facing the radial wall 46. The grooves 82, and the lands formed therebetween, consequently function as a labyrinth seal between the carrier 56 and the radial wall 46, thereby sealing the leakage path through the narrow axial gap.

The foregoing has described a brush seal that reduces premature and excessive bristle wear due to significant engine alignment offsets. While specific embodiments of the present invention have been described, it will be apparent to those skilled in the art that various modifications thereto can be made without departing from the spirit and scope of the invention as defined in the appended claims.

What is claimed is:

1. A brush seal comprising:
    a holder;
    a carrier moveably suspended from said holder by a circumferential array of axially extending flexible support wires said flexible support wires allow radial movement of said carrier and constrain axial movement of said carrier; and
    a plurality of bristles secured to said carrier and adapted to sealingly engage a rotating member.

2. The brush seal of claim 1 wherein said holder is disposed in a seal pocket formed in a stationary member.

3. The brush seal of claim 2 further comprising a retainer plate fixedly secured to said stationary member to retain said holder in said seal pocket.

4. The brush seal of claim 2 wherein said seal pocket includes a wall, said carrier being spaced from said wall.

5. The brush seal of claim 4 further comprising a plurality of concentric grooves formed in a surface of said carrier that is facing said wall.

6. The brush seal of claim 1 further comprising a slot formed in one of said carrier or said holder, and a tang formed on the other of said carrier or said holder, said tang being received in said slot.

7. The brush seal of claim 6 further comprising a flexible link disposed in said slot between said carrier and said tang.

8. The brush seal of claim 7 wherein said tang has a pressure side and said flexible link engages said pressure side of said tang.

9. The brush seal of claim 1 wherein said carrier has a flange formed thereon.

10. The brush seal of claim 9 wherein said flange has a plurality of pockets formed therein.

11. The brush seal of claim 9 further comprising a slot formed in said flange, and a tang formed on said holder, said tang being received in said slot.

12. The brush seal of claim 11 further comprising a flexible link disposed in said slot between said flange and said tang.

13. The brush seal of claim 12 wherein said tang has a pressure side, and said flexible link engages said pressure side of said tang.

14. The brush seal of claim 1 wherein a first end of each support wire is received in a corresponding one of a plurality of holes formed in said holder, and a second end of each support wire is received in a corresponding one of a plurality of holes formed in said carrier.

15. The brush seal of claim 14 wherein said holes formed in said holder and said holes formed in said carrier are tapered.

16. A brush seal for sealing a leakage path located between a stationary member and a rotating member that rotates about an axis, said brush seal comprising:
    an annular holder disposed coaxially about said axis and adapted to be attached to said stationary member;
    an annular carrier disposed within said holder and moveably suspended from said holder by a plurality of axially extending flexible support wires said flexible support wires allow radial movement of said carrier and constrain axial movement of said carrier; and
    a plurality of bristles secured to said carrier and adapted to sealingly engage said rotating member.

17. The brush seal of claim 16 wherein said holder is adapted to be disposed in a seal pocket formed in said stationary member.

18. The brush seal of claim 17 further comprising a retainer plate adapted to be fixedly secured to said stationary member to retain said holder in said seal pocket.

19. The brush seal of claim 17 further comprising a plurality of concentric grooves formed in a surface of said carrier.

20. The brush seal of claim 16 wherein said holder defines an inside diameter and said carrier defines an outside diameter that is less than said inside diameter so as to provide a clearance between said holder and said carrier.

21. The brush seal of claim 16 wherein said carrier has a flange formed thereon, said flange extending axially with respect to said axis.

22. The brush seal of claim 21 wherein said flange has a plurality of pockets formed therein.

23. The brush seal of claim 21 further comprising a slot formed in said flange, and a tang formed on said holder, said tang being received in said slot.

24. The brush seal of claim 23 further comprising a flexible link disposed in said slot between said flange and said tang.

25. The brush seal of claim 24 wherein said tang has a pressure side, and said flexible link engages said pressure side of said tang.

26. The brush seal of claim 16 wherein a first end of each support wire is received in a corresponding one of a plurality of holes formed in said holder, and a second end of each support wire is received in a corresponding one of a plurality of holes formed in said carrier.

27. The brush seal of claim 26 wherein said holes formed in said holder and said holes formed in said carrier are tapered.

* * * * *